US012770586B2

(12) United States Patent
Chen et al.

(10) Patent No.: US 12,770,586 B2
(45) Date of Patent: Oct. 20, 2026

(54) CHOLESTERIC LIQUID CRYSTAL DEVICE AND DRIVING METHOD FOR PARTIALLY UPDATING IMAGE OF CHOLESTERIC LIQUID CRYSTAL DEVICE

(71) Applicant: GENETOUCH CORP., Taoyuan City (TW)

(72) Inventors: Cheng-Yu Chen, Taoyuan City (TW); Chi Lee, Taoyuan City (TW)

(73) Assignee: GENETOUCH CORP., Taoyuan City (TW)

( * ) Notice: Subject to any disclaimer, the term of this patent is extended or adjusted under 35 U.S.C. 154(b) by 0 days.

(21) Appl. No.: 19/319,503

(22) Filed: Sep. 4, 2025

(65) Prior Publication Data

US 2026/0073884 A1 Mar. 12, 2026

(30) Foreign Application Priority Data

Sep. 12, 2024 (TW) ................................ 113134735

(51) Int. Cl.
*G09G 3/36* (2006.01)
*G09G 3/20* (2006.01)

(52) U.S. Cl.
CPC ......... *G09G 3/3607* (2013.01); *G09G 3/2096* (2013.01); *G09G 3/3696* (2013.01); *G09G 2320/0233* (2013.01); *G09G 2320/0242* (2013.01); *G09G 2320/0686* (2013.01); *G09G 2360/16* (2013.01)

(58) Field of Classification Search
CPC ............... G09G 3/3607; G09G 3/3696; G09G 2320/0233; G09G 2320/0242; G09G 2320/0686; G09G 2360/16
See application file for complete search history.

(56) References Cited

U.S. PATENT DOCUMENTS

2003/0085858 A1* 5/2003 Okafuji ................ G09G 3/3692 345/87
2013/0050598 A1* 2/2013 Uehara ............... G02F 1/13306 349/33

FOREIGN PATENT DOCUMENTS

CN 113889046 A * 1/2022 ........... G09G 3/3648
JP 2000267066 A * 9/2000
KR 100706222 B1 * 4/2007 ........... G02F 1/1368

OTHER PUBLICATIONS

English translation of JP-2000267066-A (Year: 2000).*
English translation of CN-113889046-A (Year: 2022).*
English translation of KR-100706222-B1 (Year: 2007).*

* cited by examiner

*Primary Examiner* — Lixi C Simpson
(74) *Attorney, Agent, or Firm* — RABIN & BERDO, P.C.

(57) ABSTRACT

The present invention discloses a cholesteric liquid crystal device and a driving method for partially updating an image thereof. The cholesteric liquid crystal device and the driving method partially update the color differences of a part of the pixels in the row circuit structure and maintain the color differences of the other pixels in the row circuit structure.

7 Claims, 7 Drawing Sheets

CHOLESTERIC LIQUID CRYSTAL DEVICE AND DRIVING METHOD FOR PARTIALLY UPDATING IMAGE OF CHOLESTERIC LIQUID CRYSTAL DEVICE

CROSS-REFERENCE TO RELATED APPLICATION(S)

This application claims the priority benefit of TW application No. 113134735 filed on Sep. 12, 2024, the entirety of which is hereby incorporated by reference herein and made a part of specification.

BACKGROUND OF THE INVENTION

1. Field of the Invention

The present invention relates to a liquid crystal device and a driving method thereof, particularly to a cholesteric liquid crystal device and a driving method for partially updating an image of the cholesteric liquid crystal device.

2. Description of the Related Art

Refer to FIG. 6: FIG. 6 is conventional structure schematic diagram of a cholesteric liquid crystal display. The cholesteric liquid crystal display 2 has a cholesteric liquid crystal panel 20. The cholesteric liquid crystal panel 20 comprises a plurality of row circuit structures 22 and a plurality of column circuit structures 21. The row circuit structures 22 are referred to as scan circuit structures, and the column circuit structures 21 are referred to as data circuit structures. Each of the row circuit structures 22 and each of the column circuit structures 21 are interlaced and form a passive matrix. In FIG. 6, the cholesteric liquid crystal panel 20 has M row circuit structures 22 and N column circuit structures 21. Generally, the cholesteric liquid crystal panel 20 has a driving chip, such as a liquid crystal driving unit 23, and the liquid crystal driving unit 23 is electrically connected to the cholesteric liquid crystal panel 20. The liquid crystal driving unit 23 outputs a column driving voltage to the plurality of column circuit structures 21, and sequentially outputs the row driving voltage to the multiple row circuit structures 22 by scanning. The row driving voltage comprises an addressing voltage and a non-addressing voltage. As shown in FIG. 6, the liquid crystal driving unit 23 sequentially outputs the addressing voltage from the $1^{th}$ row circuit structure 22 to the $M^{th}$ row circuit structure 22. The first row circuit structure 22 is called row 1, the second row circuit structure 22 is called row 2, the first column circuit structure 21 is called column 1, and so on.

The cholesteric liquid crystal has a bistable characteristic, that is, the cholesteric liquid crystal has two static states in a natural environment. One of the static states is a planar state. The other state is a focal-conic state. In the planar state, the cholesteric liquid crystal is regularly arranged and is capable of reflecting light with a specific wavelength. Generally, the planar state is referred to as a bright state. In the focal-conic state, the cholesteric liquid crystal is irregularly arranged and scatters incident light. Generally, the focal-conic state is referred to as a dark state. Conventionally, when the liquid crystal driving unit 23 updates an image, a scan line needs to be updated row by row. That is, the liquid crystal driving unit 23 outputs the row driving voltage and the column driving voltage to the row circuit structure 22 row by row. When the scan line is updated, the cholesteric liquid crystal undergoes four phases, comprising a preparation phase, an addressing phase, an evolution phase, and a non-addressing phase. In the preparation phase, the state of the cholesteric liquid crystal is clear. In the addressing phase, the cholesteric liquid crystal is turned on or tuned off. In the evolution phase, an electrical field is applied to the cholesteric liquid crystal to regulate the mix ratio of the focal-conic state and the planar state to display a gray level with distinct reflectivity. In the non-addressing phase, the cholesteric liquid crystal remains in a stable state according to the non-addressing voltage.

Refer to FIG. 7: FIG. 7 is a nine-square grid schematic diagram of the cholesteric liquid crystal panel. The cholesteric liquid crystal panel 20 sequentially scans the row circuit structure 22 from the first row circuit structure 22 to the last row circuit structure 22. Scanning a row circuit structure 22 takes a row scan time. When scanning, the cholesteric liquid crystal panel 20 partially updates an image needed to be updated for fast updating. When the cholesteric liquid crystal panel 20 partially updates the image, a whole row circuit structure 22 will be updated since the cholesteric liquid crystal panel 20 sequentially scans the row circuit structure 22. In other words, as shown in FIG. 7, multiple pixels corresponding to the same row circuit structures 22 will be simultaneously updated by the cholesteric liquid crystal panel 20. Namely, one of the pixels or one of the blocks E shown in FIG. 7 fails to be independently updated.

Further refer to FIG. 7: for the sake of convenience, the column circuit structure 21 and the row circuit structure 22 of the cholesteric liquid crystal panel 20 in FIG. 6 are divided into nine blocks. Each block of the nine blocks represents a pixel or represents a block in the image of the cholesteric liquid crystal panel 20. The blocks A, B, C, the blocks D, E, F, and the blocks G, H, I respectively represent a row circuit structure 22. The blocks A, D, G, the blocks B, E, H, and the blocks C, F, I respectively represent a column circuit structure 21. Take the row circuit structure 22 having the block D, the block E, and the block F as an example: when the cholesteric liquid crystal panel 20 sequentially scans the row circuit structure 22 to update the image, the pixels to be updated are determined according to a window size of the image. For example, in the original image, when a new message located in the block E is generated, the block E needs to be updated. For the nine blocks in FIG. 7, the block D, the block F, and block E are in the same row circuit structure 22. Therefore, when the block E is updated, the block D and the block F are simultaneously updated. That is, the color difference of the block D and the color difference of the block F at the left side and the right side of the block E are updated with the color difference of the block E. After that, the color difference of the block D is distinct from the color difference of the block A and the color difference of the block G. In addition, the color difference of the block F is distinct from the color difference of the block C and the color difference of the block I.

In other words, when the cholesteric liquid crystal panel 20 sequentially scans the row circuit structures 22, the row circuit structures 22 receive different row driving voltages and different column driving voltages, which may cause the color difference between the block D and the block G. Similarly, the color differences between the blocks A, D, G may also be induced.

Accordingly, how to provide a cholesteric liquid crystal device and a driving method for partially updating an image of a cholesteric liquid crystal device to overcome the problem of color difference is an urgent subject to tackle.

SUMMARY OF THE INVENTION

In view of above mentioned, the present invention discloses a driving method for partially updating an image of a cholesteric liquid crystal device, comprising steps as follows: respectively generating row driving signals and column driving signals to M row circuit structures and N column circuit structures of a cholesteric liquid crystal panel by a liquid crystal driving unit; wherein each row driving signal comprises an addressing voltage signal and a non-addressing row voltage signal, each column driving signal comprises a gray scale voltage signal and a non-addressing column voltage signal, pixels are respectively formed at intersections of the row circuit structures and the column circuit structures of the cholesteric liquid crystal panel, and the pixels comprise at least one pixel to be updated and at least one non-updating pixel; and when performing a non-full scan mode, outputting the addressing voltage signal and the gray scale voltage signal to the at least one pixel to be updated according to an update frequency and outputting a maintaining signal to the at least one non-updating pixel to maintain a color difference between the at least one non-updating pixel and the at least one pixel to be updated; wherein a voltage difference generated on the at least one pixel to be updated between the addressing voltage signal and the gray scale voltage signal is greater than or equal to a pixel voltage state transition value.

The present invention further discloses a cholesteric liquid crystal device, comprising a cholesteric liquid crystal panel and a liquid crystal driving unit. The cholesteric liquid crystal panel has M row circuit structures and N column circuit structures. Pixels are respectively formed at intersections of the row circuit structures and the column circuit structures and the pixels comprise at least one pixel to be updated and at least one non-updating pixel. The liquid crystal driving unit is connected to the cholesteric liquid crystal panel. The liquid crystal driving unit respectively generates row driving signals and column driving signals to the M row circuit structures and the N column circuit structures of the cholesteric liquid crystal panel. Each row driving signal comprises an addressing voltage signal and a non-addressing row voltage signal and each column driving signal comprises a gray scale voltage signal and a non-addressing column voltage signal. When the liquid crystal driving unit performs a non-full scan mode, the liquid crystal driving unit outputs the addressing voltage signal and the gray scale voltage signal to the at least one pixel to be updated according to an update frequency and outputs a maintaining signal to the at least one non-updating pixel to maintain a color difference between the at least one non-updating pixel and the at least one pixel to be updated. A voltage difference generated on the at least one pixel to be updated between the addressing voltage signal and the gray scale voltage signal is greater than or equal to a pixel voltage state transition value.

As mentioned above, the cholesteric liquid crystal device and the driving method for partially updating an image thereof of the present invention utilizes various methods to partially update the image without changing the color difference of the other images. Accordingly, when the cholesteric liquid crystal partially updates the image, the problems that illumination is higher and the color difference of the image is non-uniform can be solved.

DETAILED DESCRIPTION OF THE INVENTION

Figure 1:
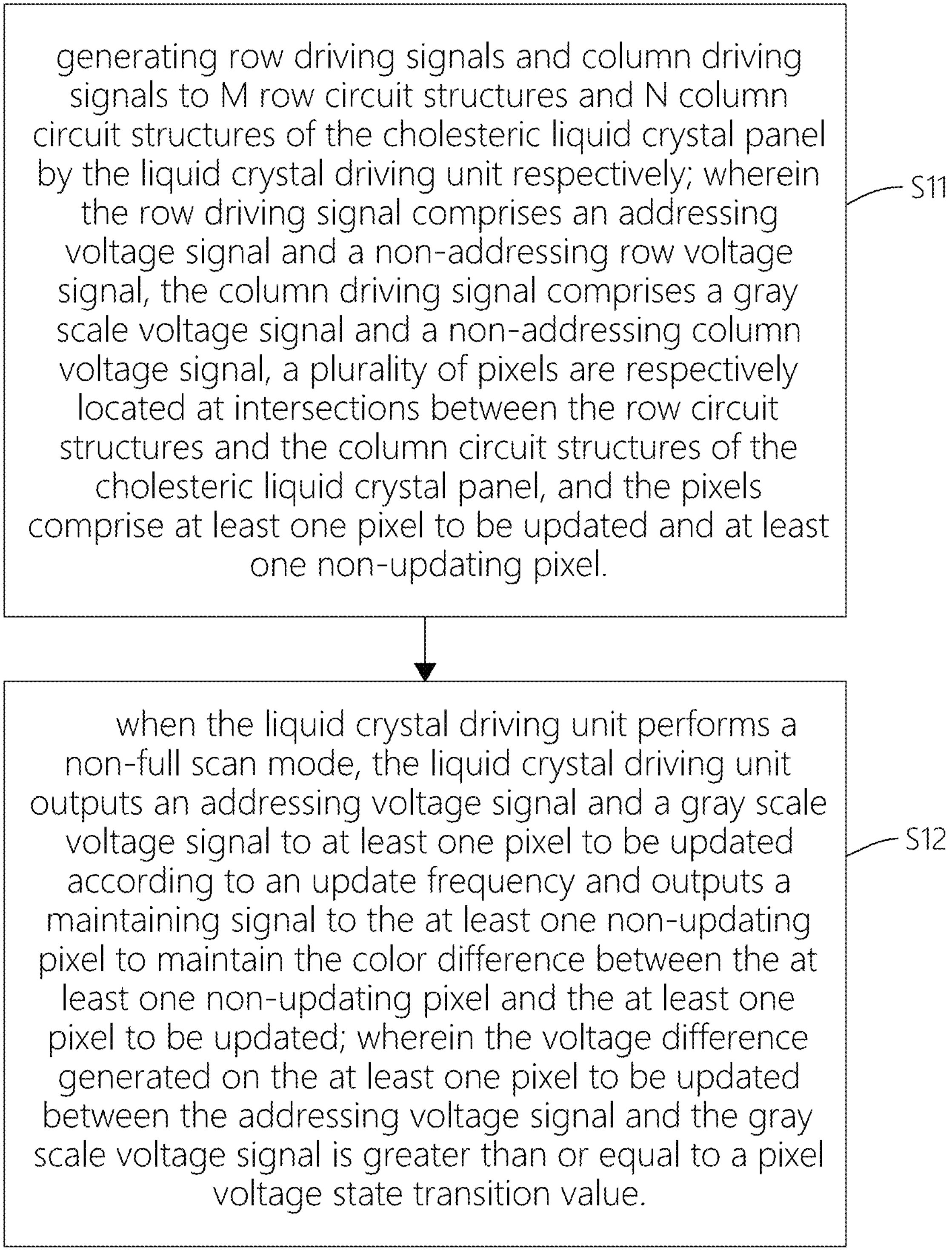
FIG. 1 is the flow diagram of the driving method for partially updating the image of a cholesteric liquid crystal device of the present invention.

Refer to FIG. 1: FIG. 1 is the flow diagram of the driving method for partially updating an image of a cholesteric liquid crystal device of the present invention. The driving method for partially updating the images of the cholesteric liquid crystal device comprises steps as follows. In step S11, the liquid crystal driving unit respectively generates row driving signals and column driving signals to M row circuit structures and N column circuit structures of the cholesteric liquid crystal panel. Each row driving signal comprises an addressing voltage signal and a non-addressing row voltage signal. Each column driving signal comprises a gray scale voltage signal and a non-addressing column voltage signal. A plurality of pixels are respectively located at intersections between the row circuit structures and the column circuit structures of the cholesteric liquid crystal panel. The pixels comprise at least one pixel to be updated and at least one non-updating pixel. The pixel to be updated has a first color difference. The non-updating pixel has a second color difference. In step S12, when the liquid crystal driving unit performs a non-full scan mode, the liquid crystal driving unit outputs an addressing voltage signal and a gray scale voltage signal to at least one pixel to be updated according to an update frequency and outputs a maintaining signal to the at least one non-updating pixel to maintain the color difference between the at least one non-updating pixel and the at least one pixel to be updated. The voltage difference generated on the at least one pixel to be updated between the addressing voltage signal and the gray scale voltage signal is greater than or equal to a pixel voltage state transition value.

As mentioned above, the formula for calculating the color difference is:

$$\Delta E=((\Delta L)^{\wedge}2+(\Delta a)^{\wedge}2+(\Delta b)^{\wedge}2)^{\wedge}0.5;$$

wherein ΔL=L2−L1, Δa=a2−a1, Δb=b2−b1, L1, a1, and b1 are L*, a*, and b* values of the first color in the two colors, L2, a2, and b2 are L*, a*, and b* values of the second color in the two colors, ΔE represents the color difference between the two colors. The lower the ΔE is, the closer the color difference is. That is, the slighter the color difference is, the closer the two colors are. In addition, since the method for calculating the color difference is distinct in a different color space, the present invention is not limited thereto. Furthermore, in an RGB color space, the color difference is generated by calculating a value of a sum of square of ΔR, ΔG, and ΔB and a square root of the value; wherein ΔR, ΔG, and ΔB are deviations of each channel. In a CIELAB (referred to as lab) color space, the method for calculating ΔE of the color difference is:

$$\Delta E=[(\Delta L)^{\wedge}2+(\Delta a)^{\wedge}2+(\Delta b)^{\wedge}2]^{\wedge}0.5;$$

wherein ΔL, Δa, and Δb are the deviations of L, a, and b values of the two colors in the CIELAB color space. In an LCH color space, the method for calculating the color difference is based on the CIELAB color space; wherein C is chroma and H is hue. The ΔE of the color difference is generated by transforming the color from the RGB color space to the LCH color space and calculating ΔL, ΔC, and ΔH; wherein ΔL is luminance, ΔC is a color saturation, and ΔH is hue.

Figure 2:
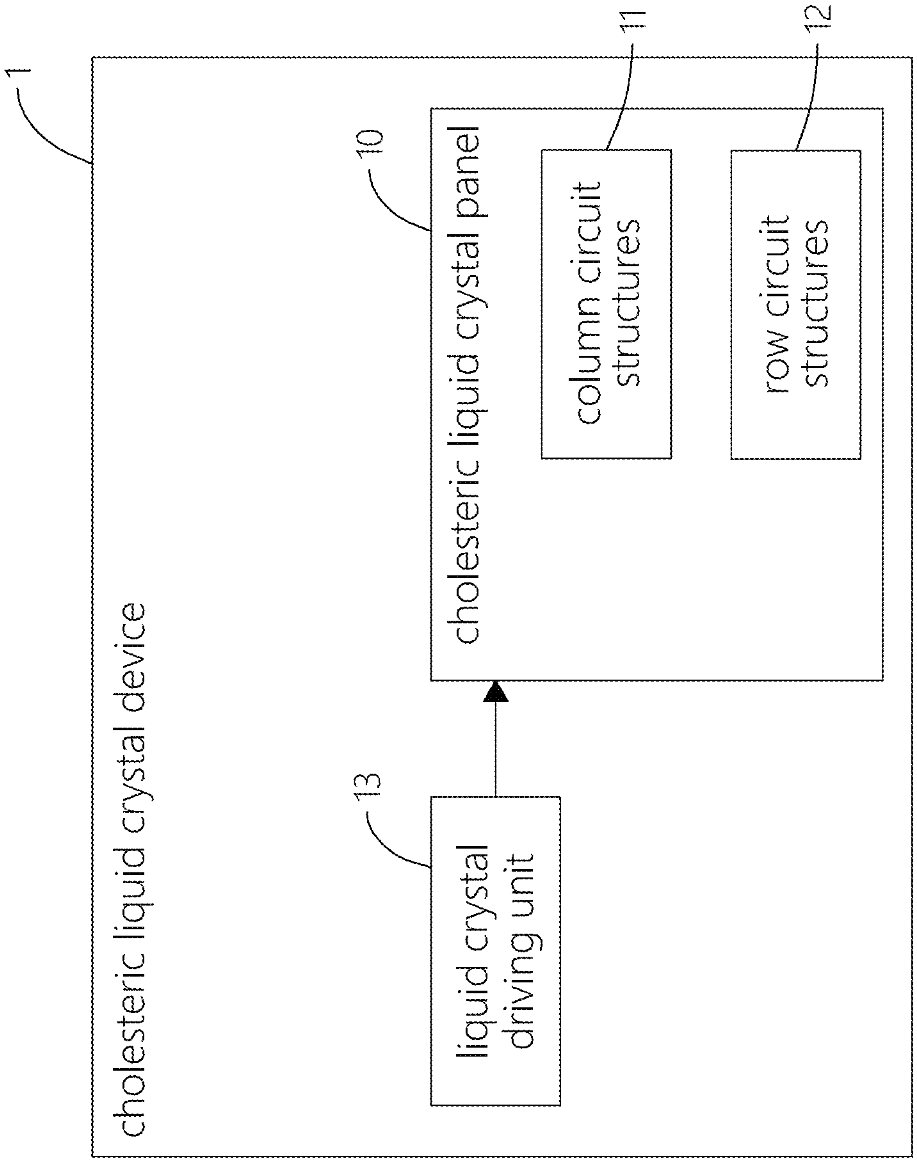
FIG. 2 is the block diagram of the cholesteric liquid crystal device of the present invention.

Refer to FIG. 2: FIG. 2 is the block diagram of the cholesteric liquid crystal device of the present invention. The cholesteric liquid crystal device 1 comprises a cholesteric liquid crystal panel 10 and a liquid crystal driving unit 13. The cholesteric liquid crystal panel 10 has M column circuit structures 11 and N row circuit structures 12. A pixel is formed at an intersection of a row circuit structure 12 and a column circuit structure 11. The pixels comprise at least one pixel to be updated and at least one non-updating pixel. An updated area is formed by multiple pixels to be updated. A non-updated area is formed by multiple non-updating pixels. The liquid crystal driving unit 13 is connected to the cholesteric liquid crystal panel 10. The liquid crystal driving unit 13 respectively generates row driving signals and column driving signals to the M row circuit structures 12 and the N column circuit structures 11 of the cholesteric liquid crystal panel 10. Each row driving signal comprises the addressing voltage signal and the non-addressing row voltage signal. The column driving signal comprises the gray scale voltage signal and the non-addressing column voltage signal. When the liquid crystal driving unit 13 performs the non-full scan mode, the liquid crystal driving unit 13 outputs the addressing voltage signal and the gray scale voltage signal to the at least one pixel to be updated according to the update frequency and outputs the maintaining signal to the at least one non-updating pixel to maintain the color difference between the at least one non-updating pixel and the at least one pixel to be updated. The voltage difference generated on the at least one pixel to be updated between the addressing voltage signal and the gray scale voltage signal is greater than or equal to the pixel voltage state transition value. In other words, when the liquid crystal driving unit 13 performs the non-full scan mode, the color differences of the pixels to be updated are updated and the color differences of the non-updating pixels are maintained by various methods disclosed in the following embodiments. In an embodiment of the present invention, the update frequency comprises a low frequency signal.

As mentioned above, when the liquid crystal driving unit performs the non-full scan mode, the liquid crystal driving unit outputs the maintaining signal including the row driving signal and the column driving signal to the at least one non-updating pixel for maintaining the color difference between the at least one pixel to be updated and the at least one non-updating pixel. The row driving signal and the column driving signal comprise a high frequency voltage signal and a high impedance voltage signal.

The high impedance (HiZ) voltage signal is used to stop outputting the voltage energy to the pixel, that is, the high impedance voltage signal is equal to an open circuit voltage signal. Furthermore, the pixel to be updated needs to be updated, and the non-updating pixel does not need to be updated. In other words, for the non-updating pixel, the cholesteric liquid crystal device provides various methods to maintain the original color difference of the non-updating pixel. In other words, when the non-updating pixel has the sufficient voltage energy, the voltage energy does not need to be provided to the non-updating pixel for transferring the state of the non-updating pixel of the cholesteric liquid crystal. Hence, the liquid crystal driving unit 13 outputs the high impedance voltage signal to stop outputting the voltage energy to the non-updating pixel to maintain the color difference of the non-updating pixel. In an embodiment of the present invention, the liquid crystal driving unit 13 outputs the high impedance voltage signal of the non-addressing row voltage signal or outputs the high impedance voltage signal of the non-addressing column voltage signal to the non-updating pixel.

The principle of the high frequency voltage signal is that a positive voltage signal and a negative voltage signal are alternatively and quickly generated to the cholesteric liquid crystal of the pixel. Furthermore, the high frequency voltage signal is of a high frequency. Therefore, even the cholesteric liquid crystal alternatively receives the positive voltage energy and the negative voltage energy, the voltage signal level of the positive voltage energy and the voltage signal level of the negative voltage energy are same as a voltage value when the frequency is quickly alternated. The cholesteric liquid crystal has a charge-discharge characteristic curve as a capacitor. When the cholesteric liquid crystal does not accumulate sufficient voltage energy, the cholesteric liquid crystal fails to be charged. That is, when the cholesteric liquid crystal cannot receive enough voltage energy for state-conversion and for update, the non-updating pixel sustains the original color difference and the original state. In an embodiment of the present invention, the liquid crystal driving unit 13 outputs the high frequency voltage signal of the non-addressing row voltage signal or outputs the high frequency voltage signal of the non-addressing column voltage signal to the non-updating pixel.

Figure 3:
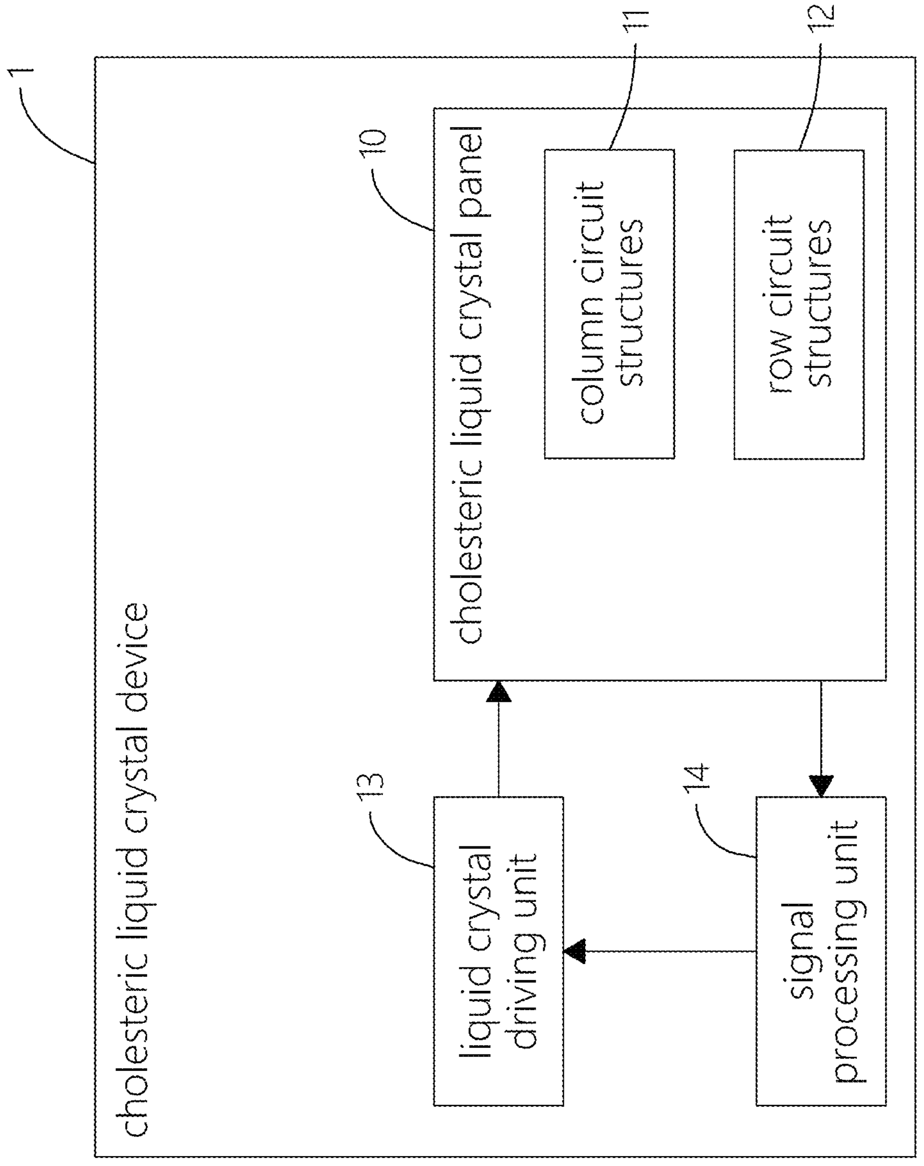
FIG. 3 is the block diagram of the cholesteric liquid crystal device comprising the signal processing unit of the present invention.

Refer to FIG. 3: FIG. 3 is the block diagram of the cholesteric liquid crystal device comprising the signal processing unit of the present invention. In the above embodiment, the update signal and the maintaining signal are generated by the signal processing unit 14 to the liquid crystal driving unit 13 so that the liquid crystal driving unit 13 performs the non-full scan mode according to the update signal and the maintaining signal. For the pixel to be updated, the liquid crystal driving unit 13 outputs the addressing voltage signal and the gray scale voltage signal to the pixel to be updated at the row circuit structure 12 according to the update signal to update the pixel to be updated. The voltage difference generated on the pixel to be updated between the addressing voltage signal and the gray scale voltage signal is greater than or equal to the pixel voltage state transition value. In an embodiment of the present invention, the addressing voltage signal comprises a display voltage signal.

For the non-updating pixel, the signal processing unit 14 generates a first maintaining signal to the liquid crystal driving unit 13 so that the liquid crystal driving unit 13 performs the non-full scan mode. In the non-full scan mode, the liquid crystal driving unit 13 outputs the non-addressing row voltage signal and the non-addressing column voltage signal to the at least one non-updating pixel to maintain the color difference between the at least one non-updating pixel and the pixel to be updated. The voltage difference on the non-updating pixel generated by the non-addressing row voltage signal and the non-addressing column voltage signal is smaller than the pixel voltage state transition value.

Moreover, for the non-updating pixel, the signal processing unit 14 generates a second maintaining signal to the liquid crystal driving unit 13 so that the liquid crystal driving unit 13 performs the non-full scan mode according to the second maintaining signal. In the non-full scan mode, the liquid crystal driving unit 13 outputs the non-addressing row voltage signal and the gray scale voltage signal to at least one non-updating pixel. The voltage difference on the non-updating pixel generated by the non-addressing row voltage signal and the gray scale voltage signal is smaller than the pixel voltage state transition value.

Figure 4:
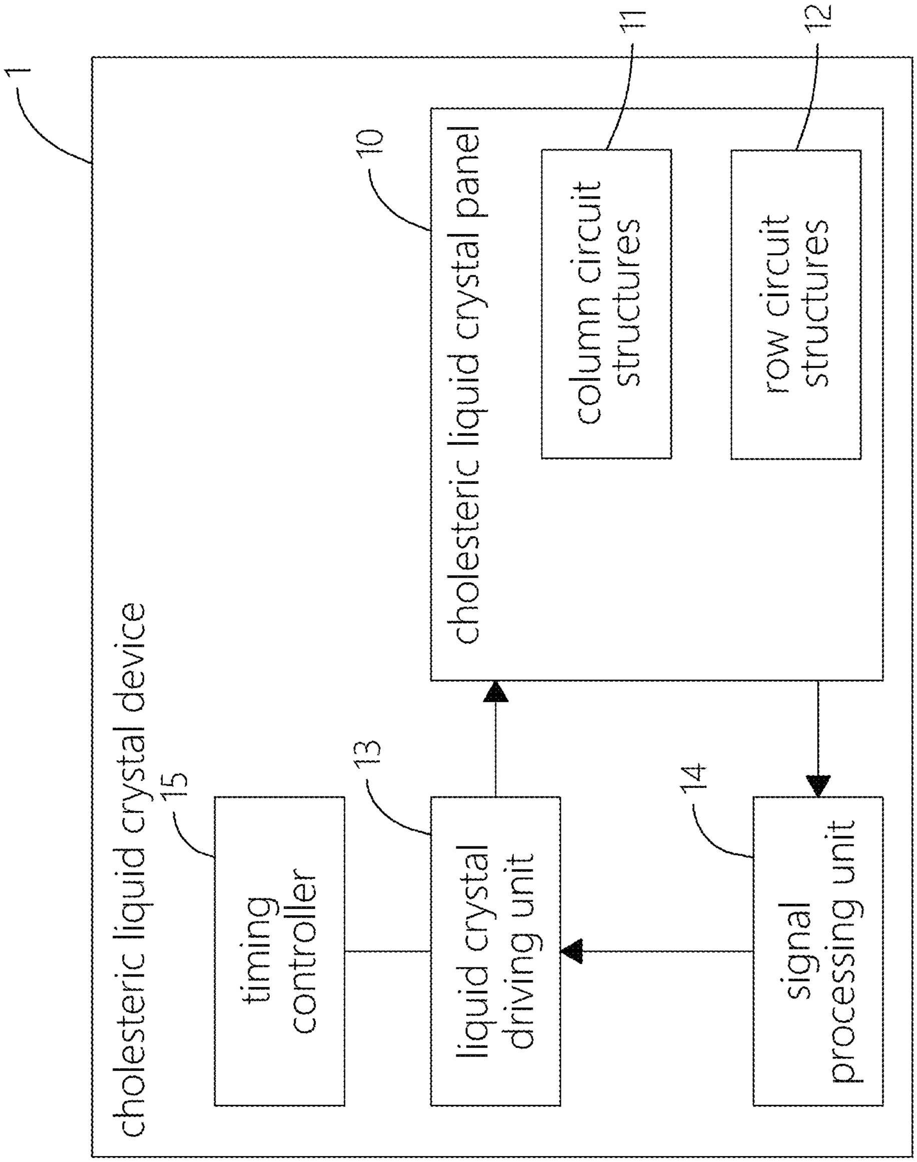
FIG. 4 is the block diagram of the cholesteric liquid crystal device further comprising the timing controller of the present invention.

Refer to FIG. 4: FIG. 4 is the block diagram of the cholesteric liquid crystal device further comprising the timing controller of the present invention. The timing controller 15 is electrically connected to the liquid crystal driving unit 13 and generates the high frequency voltage signal according to the lookup table. The principle of the high frequency voltage signal is further described as below.

Figure 5:
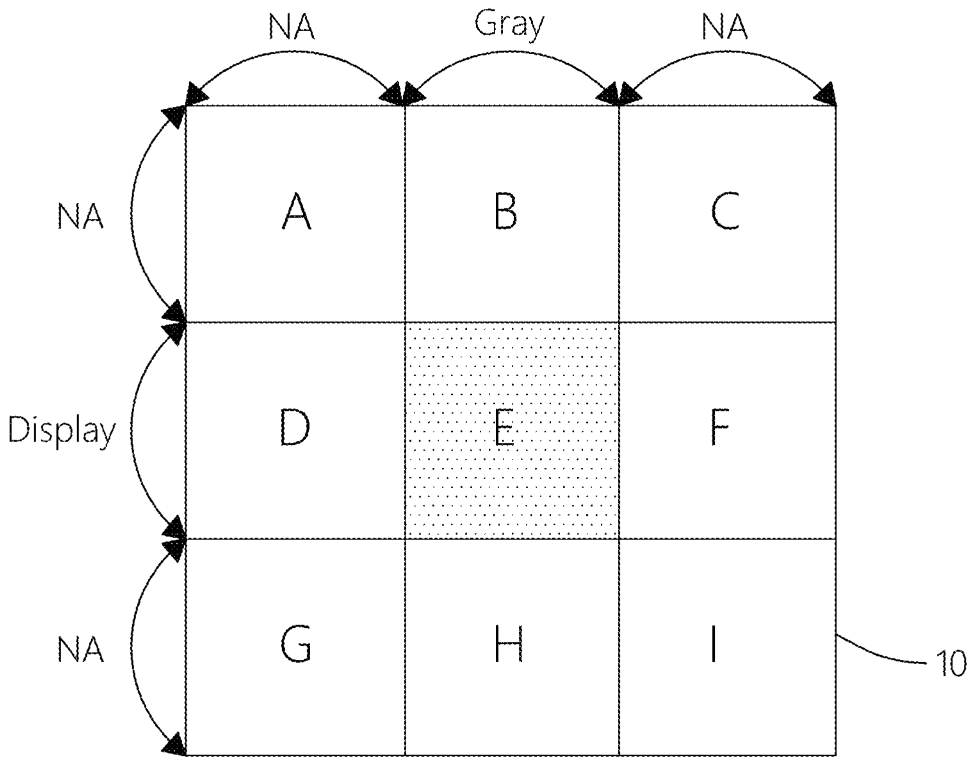
FIG. 5 is the schematic diagram of the driving method for partially updating the image of the cholesteric liquid crystal device utilized on the cholesteric liquid crystal panel.
Figure 6:
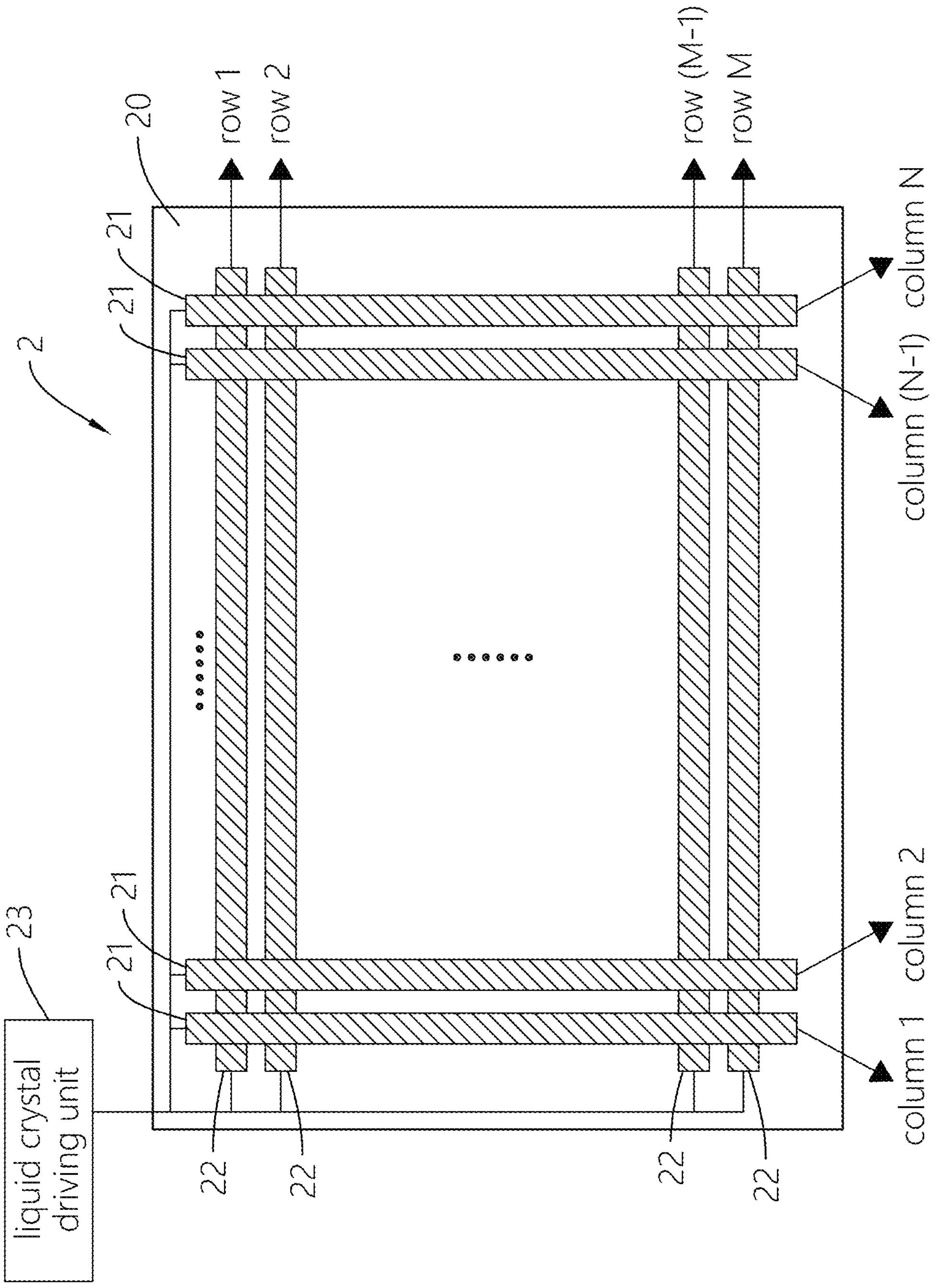
FIG. 6 is the structure schematic diagram of a conventional cholesteric liquid crystal display.
Figure 7:
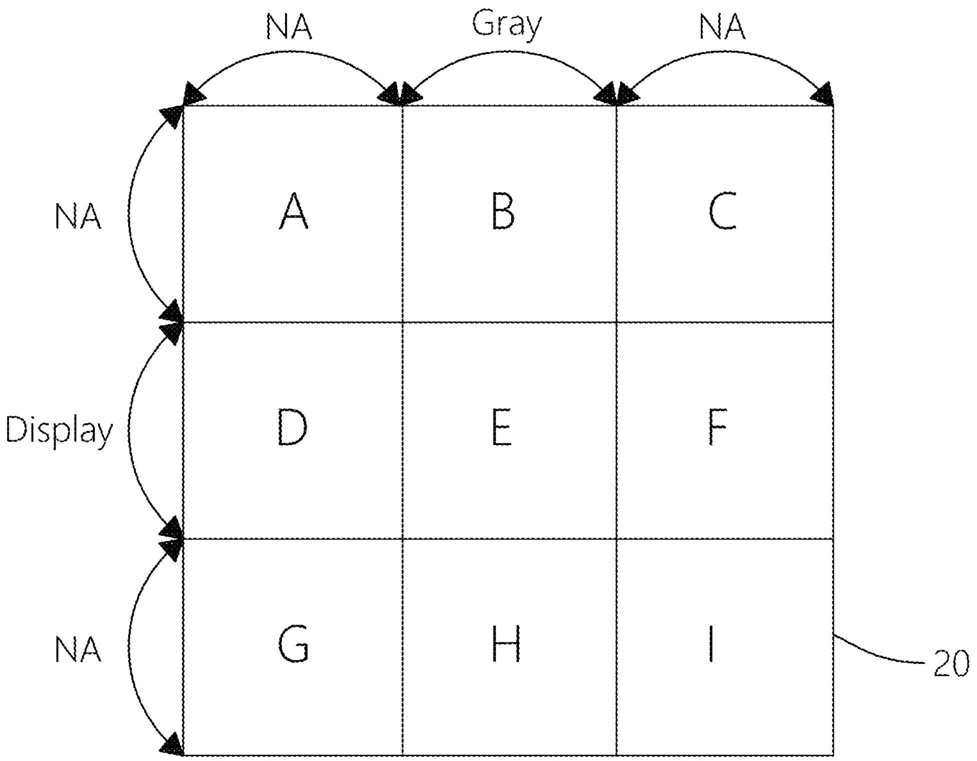
FIG. 7 is the nine-square grid schematic diagram of the cholesteric liquid crystal panel.

Refer to FIG. 5: FIG. 5 is the schematic diagram of the driving method for partially updating the image of the cholesteric liquid crystal device utilized on the cholesteric liquid crystal panel. For convenience to illustrate, in FIG. 5, the column circuit structure 11 and the row circuit structure 12 of the cholesteric liquid crystal panel 10 are divided to nine blocks. Each block represents a pixel. Alternatively, the blocks A, B, C, the blocks D, E, F, and the blocks G, H, I individually represent a row circuit structure 12. The blocks A, D, G, the blocks B, E, H, and the blocks C, F, I individually represent a column circuit structure 11. In embodiments below, each block represents a pixel.

For the block E in FIG. 5, the liquid crystal driving unit 13 outputs the addressing voltage signal and the gray scale voltage signal to the pixel such that the color difference exceeds the deviation in the row circuit structure to update the color difference of the pixel. The voltage difference on the non-updating pixel generated by the addressing voltage signal and the gray scale voltage signal is greater than the pixel voltage state transition value. That is, after the cholesteric liquid crystal of the pixel receives sufficient voltage energy, the state of the cholesteric liquid crystal is transformed. In other words, after the state of the cholesteric liquid crystal is updated and transformed, the color difference of the pixel is changed according to the state of the cholesteric liquid crystal.

For the block D and the block F in FIG. 5, the liquid crystal driving unit outputs the addressing voltage signal and the non-addressing column voltage signal to the block D and the block F in the row circuit structure to maintain the color difference of the block D and the block F. The voltage difference generated on the addressing voltage signal and the non-addressing column voltage signal on the block D and the block F is smaller than the pixel voltage state transition value. Therefore, the cholesteric liquid crystals of the block D and the block F fail to receive the sufficient voltage energy and remain in the original state. In other words, since the cholesteric liquid crystals remain in the original state, the color difference of the pixel is not varied.

For the block B and the block H in FIG. 5, the liquid crystal driving unit outputs the non-addressing row voltage signal and the gray scale voltage signal to the block B and the block H in the row circuit structure to maintain the color difference of the block B and the block H. The voltage difference generated on the non-addressing row voltage signal and the gray scale voltage signal on the block B and the block H is smaller than the pixel voltage state transition value. Therefore, the cholesteric liquid crystals of the block B and the block H fail to receive the sufficient voltage energy and remain in the original state. In other words, since the cholesteric liquid crystals remain in the original state, the color difference of the pixel is not varied.

For the block A, the block C, the block G, and the block I in FIG. 5, the liquid crystal driving unit outputs the non-addressing row voltage signal and the non-addressing column voltage signal to the block A, the block C, the block G, and the block I in the row circuit structure to maintain the color difference of the block A, the block C, the block G, and the block I. The voltage differences generated by the non-addressing row voltage signal and the non-addressing column voltage signal on the block A, the block C, the block G, and the block I are smaller than the pixel voltage state transition value. Therefore, the cholesteric liquid crystals of the block A, the block C, and the block G fail to receive the sufficient voltage energy and remain in the original states. In other words, since the cholesteric liquid crystals remain in the original state, the color differences of the pixel are not varied.

In above embodiments, whether the state of the cholesteric liquid crystal is transformed to update the color difference of the pixel is determined by the voltage difference greater than or equal to the pixel voltage state transition value inputted to the pixel. The voltage difference is determined by the row driving signal and the column driving signal inputted to the pixel. In an embodiment of the present invention, the non-addressing row voltage signal and the non-addressing column voltage signal comprise the high impedance voltage signal. In another embodiment of the present invention, the gray scale voltage signal, the non-addressing row voltage signal, and the non-addressing column voltage signal comprise the high frequency voltage signal.

Refer to Table 1: Table 1 is the relation table for the pins of the liquid crystal driving chip corresponding to the row driving signal and the column driving signal. The liquid crystal driving unit 13 comprises a liquid crystal driving chip (IC). The liquid crystal driving chip comprises multiple signal output pins. The signal output pins comprise VDM, VN3, VN2, VN1, VP1, VP2, VP3, and HiZ. The high impedance (Hi-Z) voltage signal is one of the signal output pins. Furthermore, the high impedance voltage signal generates the high impedance signal to the pixel so that the liquid crystal driving unit 13 fails to transmit the voltage energy to the pixel. That is, when the circuit connected to the pixel and the liquid crystal driving unit 13 is open, the voltage energy fails to be transmitted to the pixel of the cholesteric liquid crystal panel 10 and the state of the cholesteric liquid crystal cannot be changed.

TABLE 1

| | | Data Voltage | Scan Voltage |
|---|---|---|---|
| 0 | VDM | GND | GND |
| 1 | VN3 | −25 | −25 |
| 2 | VN2 | −16 | −11 |
| 3 | VN1 | −6 | −6 |
| 4 | VP1 | 6 | 6 |
| 5 | VP2 | 16 | 11 |
| 6 | VP3 | 25 | 25 |
| 7 | HiZ | | |

Refer to Table 2: Table 2 is the relation table for the digital control signal generated by the timing controller 15 corresponding to the pins of the liquid crystal driving chip. In an embodiment of the present invention, the frequency of the high frequency voltage signal is greater than 100K Hz. The high frequency voltage signal is generated by the timing controller 15 according to the lookup table. The timing controller 15 generates the high frequency voltage signal inputted to the liquid crystal driving unit 13 according to the lookup table. The liquid crystal driving unit 13 generates the column driving signal according to the high frequency voltage signal. In an embodiment of the present invention, the liquid crystal driving unit 13 generates the row driving signal according to the high frequency voltage signal. Alternatively, the liquid crystal driving unit 13 simultaneously generates the row driving signal and the column driving signal according to the high frequency voltage signal. In another embodiment, the high frequency voltage signal is generated by the liquid crystal driving unit 13. Furthermore, according to Tables 1 and 2, the timing controller 15 generates a binary digital signal such as 000~111 to the liquid crystal driving chip. The liquid crystal driving chip matches the binary digital signal such as 000~111 according to Table 2 with the signal output pins VDM, VN3, VN2, VN1, VP1, VP2, VP3, and HiZ. The liquid crystal driving chip generates the scan voltage or the data voltage according to Table 1. The scan voltage represents the row driving signal and the data voltage represents the column driving signal. For instance, the binary digital signal such as 000 corresponds to the VDM signal output pin according to Table 2. The VDM signal output pin corresponds to the decimal digital signal of 0 and the GND voltage according to Table 1. In addition, the binary digital signal such as 111 corresponds to the HiZ signal output pin according to Table 2. The HiZ signal output pin corresponds to the decimal digital signal of number 7 and the HiZ voltage according to Table 1 and so on.

TABLE 2

| D[3n + 2, 3n + 1, 3n] | Output[n + 1 + 2k] when SHR = H | Output[2 − n + 2k] when SHR = L |
|---|---|---|
| 000 | VDM | |
| 001 | VN3 | |
| 010 | VN2 | |
| 011 | VN1 | |
| 100 | VP1 | |
| 101 | VP2 | |
| 110 | VP3 | |
| 111 | Hi-Z | |
| XXX | GND | |
| XXX | Hi-Z | |

Refer to Table 1, Table 2, and Table 3: Table 3 is the relation table for the row driving signal corresponding to the column driving signal inputted to the cholesteric liquid crystal panel. In Table 3, D1 to D16 represent the first row circuit structure to the 16$^{th}$ row circuit structure. The SCAN signal represents the row driving signal. The DATA signal represents the column driving signal. NA in the scan signal represents the non-addressing row voltage signal. Display in the scan signal represents the addressing voltage signal. G0 to G7 in the data signal represent the gray scale voltage signal. NA in the data signal represents the non-addressing column voltage signal. Take the first row circuit structure D1 as an example: according to Table 1, Table 2, and Table 3, when the row driving signal (Scan signal) is the addressing voltage signal (Display signal), the row circuit structure D1 corresponds to number 4. The number 4 in Table 3 corresponding to the voltage value of the scan row driving signal in Table 1 is number 6. When the column driving signal (Data signal) outputs the gray scale voltage signal of G0, the first row circuit structure D1 corresponds to the number 2 in Table 3. The number 2 in Table 3 corresponding to the column driving signal (Data voltage) in Table 1 is the number-16. The voltage difference of the pixel in the cholesteric liquid crystal panel 10 can be generated by calculating the difference between the column driving signal (Data) and the row driving signal (Scan). For example, the voltage difference of the cholesteric liquid crystal in the first row circuit structure D1 is the number −22 by calculating the difference between the number −16 of the column driving signal (Data) and the number 6 of the row driving signal (Scan). Consequently, the state of the cholesteric liquid crystal of the pixel in the first row circuit structure D1 is changed and the color difference of the pixel is updated. In addition, since the polarities of the voltage fail to affect the cholesteric liquid crystal, the voltage difference is calculated to the number 22 with the absolute value.

TABLE 3

| | Scan | | Data | | | | | | | | |
|---|---|---|---|---|---|---|---|---|---|---|---|
| Duty | NA (non_addressing) | Display | G0 | G1 | G2 | G3 | G4 | G5 | G6 | G7 | NA (non_addressing) |
| D1 | 2 | 4 | 2 | 3 | 3 | 3 | 3 | 3 | 3 | 3 | 7 |
| D2 | 2 | 4 | 2 | 2 | 3 | 3 | 3 | 3 | 3 | 3 | 7 |
| D3 | 2 | 4 | 2 | 2 | 2 | 3 | 3 | 3 | 3 | 3 | 7 |
| D4 | 2 | 4 | 2 | 2 | 2 | 2 | 3 | 3 | 3 | 3 | 7 |
| D5 | 2 | 4 | 2 | 2 | 2 | 2 | 3 | 3 | 3 | 3 | 7 |
| D6 | 2 | 4 | 2 | 2 | 2 | 2 | 2 | 3 | 3 | 3 | 7 |
| D7 | 2 | 4 | 2 | 2 | 2 | 2 | 2 | 2 | 3 | 3 | 7 |
| D8 | 2 | 4 | 2 | 2 | 2 | 2 | 2 | 2 | 2 | 3 | 7 |
| D9 | 5 | 3 | 5 | 4 | 4 | 4 | 4 | 4 | 4 | 4 | 7 |
| D10 | 5 | 3 | 5 | 5 | 4 | 4 | 4 | 4 | 4 | 4 | 7 |
| D11 | 5 | 3 | 5 | 5 | 5 | 4 | 4 | 4 | 4 | 4 | 7 |
| D12 | 5 | 3 | 5 | 5 | 5 | 5 | 4 | 4 | 4 | 4 | 7 |
| D13 | 5 | 3 | 5 | 5 | 5 | 5 | 4 | 4 | 4 | 4 | 7 |
| D14 | 5 | 3 | 5 | 5 | 5 | 5 | 5 | 4 | 4 | 4 | 7 |
| D15 | 5 | 3 | 5 | 5 | 5 | 5 | 5 | 5 | 4 | 4 | 7 |
| D16 | 5 | 3 | 5 | 5 | 5 | 5 | 5 | 5 | 5 | 4 | 7 |

Furthermore, take the 9$^{th}$ row circuit structure D9 as an example: when the row driving signal (Scan signal) outputs the non-addressing voltage signal (NA), the row driving signal, the non-addressing voltage signal (NA), and the 9$^{th}$ row circuit structure D9 correspond to the number 5 in Table 3. The number 5 in Table 3 corresponds to the number 11 of the scan voltage in Table 1. In addition, when the column driving signal (Data signal) outputs the gray scale voltage signal of G0, the 9$^{th}$ row circuit structure D9 corresponds to the number 5 in Table 3. The number 5 in Table 3 corresponding to the data voltage in Table 1 is number 16. Therefore, the voltage difference of the pixel in the cholesteric liquid crystal panel 10 can be generated by calculating the difference between the column driving signal (Data) and the row driving signal (Scan). For example, the voltage difference of the cholesteric liquid crystal in the 9$^{th}$ row circuit structure D9 is number 5 by calculating the difference between the number 16 of the column driving signal (Data) and the number 5 of the row driving signal (Scan). Similarly, when the column driving signal (Data signal) outputs the gray scale voltage signal of G1 to the 9$^{th}$ row circuit structure D9, it corresponds to the number 4 in Table 3. The number 4 in Table 3 corresponds to the number 6 of the data voltage in Table 1. Hence, the value of −5 of the voltage difference of the cholesteric liquid crystal of the pixel on the 9$^{th}$ row circuit structure D9 is generated by calculating the difference between the number 6 of the data voltage and the number 11 of the scan voltage.

As mentioned above, the voltage difference calculated by the above method is the numbers positive 5 and negative −5. When the voltage differences between the non-addressing voltage signal (NA) in the row driving signal (Scan signal) and other column driving signals (Data) are calculated by the same method, all the voltage differences are between the negative value −5 and the positive value +5. Hence, the cholesteric liquid crystal of the pixel in the 9$^{th}$ row circuit structure D9 sustains the same state and the maintains the same color difference.

Moreover, since the color difference of the block E needs to be updated in FIG. 5, the liquid crystal driving unit 13 outputs the signal frequency with the low frequency to the block E. Therefore, after the cholesteric liquid crystal of the block E receives the voltage energy greater than or equal to the pixel voltage state transition value, the cholesteric liquid crystal of the block E has the sufficient voltage energy to overcome the voltage difference. The state of the cholesteric liquid crystal can be transformed and the color difference of the block E can be updated. For the blocks A, B, C, D, F, G, H, and I in FIG. 5, since the color difference of the blocks A, B, C, D, F, G, H, and I fail to be updated, the liquid crystal driving unit 13 outputs the signal frequency with the high frequency to the blocks A, B, C, D, F, G, H, and I. Therefore, even the cholesteric liquid crystals of the blocks A, B, C, D, F, G, H, and I receive the voltage energy greater than or equal to the pixel voltage state transition value, the cholesteric liquid crystals of the blocks A, B, C, D, F, G, H, and I have the insufficient voltage energy to overcome the voltage difference. The state of the cholesteric liquid crystal of the blocks A, B, C, D, F, G, H, and I cannot be transformed and the color difference of the blocks A, B, C, D, F, G, H, and I cannot be updated. That is, the blocks A, B, C, D, F, G, H, and I maintain the original color difference.

Furthermore, when the 1$^{st}$ row circuit structure receives the addressing voltage signal of the row driving signal and receives the NA signal of the column driving signal, the addressing voltage signal corresponds to the number 6 of the voltage value and the NA signal of the column driving signal corresponds to the high impedance voltage signal. Consequently, the cholesteric liquid crystal in the 1$^{st}$ row circuit structure D1 fails to receive the voltage energy due to the high impedance voltage signal. Accordingly, the pixel sustains in the same state and the pixel maintains the original color difference. The voltage of the other row driving signals and the voltage of the other column driving signals are calculated by this way and the details are omitted.

Moreover, in the embodiment, a block represents a pixel. For example, the color differences of the pixels to be updated need to be updated, and the color differences of the non-updating pixel do not need to be updated. Multiple blocks formed by the pixels to be updated form an updated image on the cholesteric liquid crystal pane. Other blocks formed by the non-updating pixel form the non-updated image. Furthermore, when the voltage difference generated on the row driving signal and the column driving signal is greater than or equal to the pixel voltage state transition value, the state of the pixel in the row circuit structure is changed. For example, when the voltage difference between the addressing voltage signal and the non-addressing column voltage signal is greater than or equal to the pixel voltage state transition value, the state of the pixel in the row circuit structure is transformed. However, when the high frequency voltage signal is inputted to the pixel in the row circuit structure, the cholesteric liquid crystal of the pixel fails to accumulate the sufficient voltage energy to change the state because of the high frequency voltage signal with swift alternations between positive and negative frequencies. For the non-updated image, the color difference of the non-updated image fails to be transformed. Furthermore, in the above embodiment wherein the row driving signal and the column driving signal are generated according to the lookup table, for the non-updated image, the column driving signal generated by the timing controller according to the lookup table is the high frequency voltage signal. The high frequency voltage signal is swiftly altered between positive and negative frequencies.

For the updated frame, when the voltage difference generated on the row driving signal and the column driving signal is greater than or equal to the pixel voltage state transition value and the row driving signal and the column driving signal are generated by the low frequency, the state of the cholesteric liquid crystal can be transformed after the cholesteric liquid crystal continuously receives the sufficient voltage energy. Hence, for the updated frame, the color difference of the updated frame can be updated and changed. Moreover, for the updated frame, when the timing controller generates the row driving signal and the column driving signal according to the lookup table and the voltage difference between the row driving signal and the column driving signal is greater than or equal to the pixel voltage state transition value, the state of the cholesteric liquid crystal can be changed and the color difference of the updated frame is further updated.

In summary, the cholesteric liquid crystal device and the driving method for partially updating the image thereof in the present invention generate the high impedance voltage signal and the high frequency voltage signal to maintain the color difference of the non-updated image and to update the color difference of the updated image in the cholesteric liquid crystal panel. By this way, when the cholesteric liquid crystal partially updates the image, the problems that illumination of the image is higher and the color difference of the image is non-uniform can be solved. Furthermore, the high frequency voltage signal can be generated by a manual mode, a software, and a hardware. The manual mode and the software regulate the voltage of the lookup table in the timing controller. The hardware provides the liquid crystal driving unit capable of generating the high frequency voltage signal. Accordingly, the present invention can be widely and flexibly utilized in various fields.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A driving method for partially updating an image of a cholesteric liquid crystal device, comprising steps as follows:

respectively generating row driving signals and column driving signals to M row circuit structures and N column circuit structures of a cholesteric liquid crystal panel by a liquid crystal driving unit; wherein each row driving signal comprises an addressing voltage signal and a non-addressing row voltage signal, each column driving signal comprises a gray scale voltage signal and a non-addressing column voltage signal, pixels are respectively formed at intersections of the row circuit structures and the column circuit structures, and the pixels comprise at least one pixel to be updated and at least one non-updating pixel;

when performing a non-full scan mode by the liquid crystal driving unit, outputting the addressing voltage signal of one of the row driving signals and the gray scale voltage signal of one of the column driving signals to the at least one pixel to be updated according to an update frequency and outputting a maintaining signal to the at least one non-updating pixel to maintain a color difference between the at least one non-updating pixel and the at least one pixel to be updated by the liquid crystal driving unit;

wherein a voltage difference generated on the at least one pixel to be updated between the addressing voltage signal of the one row driving signal and the gray scale voltage signal of the one column driving signal is greater than or equal to a pixel voltage state transition value;

wherein the maintaining signal outputted to the at least one non-updating pixel comprises the one row driving signal and the one column driving signal;

wherein the one column driving signal of the maintaining signal comprises a high frequency voltage signal; and wherein a frequency of the high frequency voltage signal is greater than 100K Hz.

2. The driving method for partially updating an image of the cholesteric liquid crystal device as claimed in claim 1, wherein the high frequency voltage signal is generated by a timing controller according to a lookup table;

wherein the timing controller generates the high frequency voltage signal according to the lookup table to the liquid crystal driving unit, and the liquid crystal driving unit generates the one column driving signal of the maintaining signal according to the high frequency voltage signal.

3. The driving method for partially updating an image of the cholesteric liquid crystal device as claimed in claim 1, wherein the high frequency voltage signal is generated by the liquid crystal driving unit.

4. A cholesteric liquid crystal device, comprising:

a cholesteric liquid crystal panel, having M row circuit structures and N column circuit structures; wherein pixels are respectively formed at intersections of the row circuit structures and the column circuit structures and the pixels comprise at least one pixel to be updated and at least one non-updating pixel; and a liquid crystal driving unit, connected to the cholesteric liquid crystal panel, respectively generating row driving signals and column driving signals to the M row circuit structures and the N column circuit structures of the cholesteric liquid crystal panel; wherein each row driving signal comprises an addressing voltage signal and a non-addressing row voltage signal and each column driving signal comprises a gray scale voltage signal and a non-addressing column voltage signal;

when performing a non-full scan mode, outputting the addressing voltage signal of one of the row driving signals and the gray scale voltage signal of one of the column driving signals to the at least one pixel to be updated according to an update frequency and outputting a maintaining signal to the at least one non-updating pixel to maintain a color difference between the at least one non-updating pixel and the at least one pixel to be updated by the liquid crystal driving unit;

wherein a voltage difference generated on the at least one pixel to be updated between the addressing voltage signal of the one row driving signal and the gray scale voltage signal of the one column driving signal is greater than or equal to a pixel voltage state transition value;

wherein the liquid crystal driving unit outputs the one row driving signal and the one column driving signal included in the maintaining signal to the at least one non-updating pixel to maintain the color difference between the at least one non-updating pixel and the at least one pixel to be updated; wherein the one column driving signal comprises a high frequency voltage signal; and wherein a frequency of the high frequency voltage signal is greater than 100K Hz.

5. The cholesteric liquid crystal device as claimed in claim 4, wherein the high frequency voltage signal is generated by a timing controller according to a lookup table and the timing controller generates the high frequency voltage signal according to the lookup table to the liquid crystal driving unit so that the liquid crystal driving unit generates the one column driving signal according to the high frequency voltage signal.

6. The cholesteric liquid crystal device as claimed in claim 4, wherein the high frequency voltage signal is generated by the liquid crystal driving unit.

7. The cholesteric liquid crystal device as claimed in claim 4, wherein the addressing voltage signal comprises a display voltage signal.

* * * * *